United States Patent
Gaikwad et al.

(10) Patent No.: US 10,308,405 B2
(45) Date of Patent: Jun. 4, 2019

(54) OIL DISPENSING LID

(71) Applicant: DES-CASE CORPORATION, Goodlettsville, TN (US)

(72) Inventors: Nikhil Rajkumar Gaikwad, Goodlettsville, TN (US); Cody Curtsinger, White House, TN (US); Keith Mawdsley, Hendersonville, TN (US); Michelle Lynn Arceneaux, Cane Ridge, TN (US); Jonathan Haworth, Hendersonville, TN (US)

(73) Assignee: Des-Case Corporation, Goodlettsville, TN (US)

( * ) Notice: Subject to any disclaimer, the term of this patent is extended or adjusted under 35 U.S.C. 154(b) by 0 days.

(21) Appl. No.: 14/949,522

(22) Filed: Nov. 23, 2015

(65) Prior Publication Data

US 2016/0145012 A1    May 26, 2016

Related U.S. Application Data

(60) Provisional application No. 62/085,044, filed on Nov. 26, 2014.

(51) Int. Cl.
*B65D 51/24* (2006.01)
*B65D 47/32* (2006.01)
(Continued)

(52) U.S. Cl.
CPC ......... *B65D 51/242* (2013.01); *B65D 47/248* (2013.01); *B65D 47/32* (2013.01);
(Continued)

(58) Field of Classification Search
CPC .... B65D 47/24; B65D 47/26; B65D 47/2018; B65D 47/2093; B65D 47/32; B65D 47/06;
(Continued)

(56) References Cited

U.S. PATENT DOCUMENTS 202,734 A * 4/1878 Lester ........................... 222/484
389,871 A * 9/1888 Burroughs ........... B65D 47/263
222/484
(Continued)

FOREIGN PATENT DOCUMENTS

CA    2354767    * 3/2000
JP    08-282699 A    10/1996
(Continued)

OTHER PUBLICATIONS

International Search Report in corresponding International Application No. PCT/US2015/062389, dated Mar. 8, 2016, 3 pp.
(Continued)

*Primary Examiner* — Lien Ngo
(74) *Attorney, Agent, or Firm* — Patterson Intellectual Property Law, P.C.; Ryan D. Levy; Grant M. Ford (57) ABSTRACT

A lid body of a lid apparatus includes a spout opening defined in the lid body; a handle opposite the spout opening; and a vent opening defined in the lid body between the spout opening and the handle. The lid apparatus also includes an elongate pin slidably received in the body and translatable between a closed position and an open position. The elongate pin includes a spout sealing end in sealing contact with the lid body to close the spout opening in the closed position; an actuating end opposite the spout sealing end; and a vent sealing portion in sealing contact with the lid body to close the vent opening in the closed position. A resilient member biases the elongate pin into the closed position. An actuator disposed on the handle and connected to the actuating end may be pulled to pull the elongate pin into the open position.

18 Claims, 9 Drawing Sheets

(51) Int. Cl.
*B65D 47/24* (2006.01)
*F16N 3/04* (2006.01)
*F16N 3/08* (2006.01)

(52) U.S. Cl.
CPC ............... *F16N 3/04* (2013.01); *F16N 3/08* (2013.01); *B65D 2525/282* (2013.01)

(58) Field of Classification Search
CPC ............ B65D 51/242; B65D 47/248; B65D 2525/282; F16N 3/04; F16N 3/08
USPC ... 222/470, 464–465, 509–511, 518, 153.04, 222/153.15, 105, 106, 471–475, 484; 220/23.9, 495.01–495.03
See application file for complete search history.

(56) References Cited

U.S. PATENT DOCUMENTS

| | | | | |
|---|---|---|---|---|
| 479,217 | A * | 7/1892 | Kaplan | 222/245 |
| 553,563 | A * | 1/1896 | McCarthy | F16N 3/04 222/487 |
| 832,499 | A * | 10/1906 | Nystrom et al. | B65D 47/06 222/481 |
| 1,103,319 | A * | 7/1914 | Schisler | F16N 3/04 222/474 |
| 1,140,034 | A * | 5/1915 | Hensen | B65D 25/385 220/86.1 |
| 1,362,186 | A * | 12/1920 | Price | B65D 25/40 222/462 |
| 1,696,079 | A * | 12/1928 | Doolin | G01F 19/00 220/86.1 |
| 2,554,293 | A * | 5/1951 | Brown | A47G 19/12 222/470 |
| 2,673,665 | A * | 3/1954 | Smith | B65D 25/2858 222/475 |
| 3,059,817 | A * | 10/1962 | Tregoning | B65D 47/286 222/245 |
| 3,146,913 | A * | 9/1964 | Nagai | B65D 47/283 222/110 |
| 3,211,324 | A * | 10/1965 | Sapien | B05B 7/2408 220/495.02 |
| 4,834,270 | A * | 5/1989 | Messner | F16N 3/04 222/484 |
| 5,000,360 | A * | 3/1991 | Lown | B67D 7/005 222/521 |
| 5,520,337 | A | 5/1996 | Fuchs | |
| 5,722,570 | A * | 3/1998 | Sultzer, III | B65D 47/063 222/529 |
| 6,006,961 | A * | 12/1999 | Wark | B67D 7/005 222/1 |
| 8,567,646 | B1 * | 10/2013 | Cray | B67D 7/005 222/478 |
| 2005/0284959 | A1 | 12/2005 | Hubmann et al. | |
| 2008/0029554 | A1 | 2/2008 | Faure et al. | |
| 2011/0168717 | A1 * | 7/2011 | Boboltz | B65D 25/16 220/495.02 |

FOREIGN PATENT DOCUMENTS

WO 2011109401 A1 9/2011
WO 2014-032169 A1 3/2014

OTHER PUBLICATIONS

Supplementary European Search Report for corresponding European Application No. 15 86 4168, dated Oct. 9, 2018, 9 pages.

* cited by examiner

OIL DISPENSING LID

CROSS-REFERENCES TO RELATED APPLICATIONS

This application claims benefit of U.S. Provisional Patent Application No. 62/085,044, dated Nov. 26, 2014, and which is hereby incorporated by reference.

BACKGROUND

The present disclosure relates generally to a device for dispensing liquid. More particularly, the present disclosure pertains to a device for creating variable flow of a liquid through a gravity fed dispenser.

Fluid dispensing containers are known in the art. For instance, gas cans are often provided to hold gasoline, and a nozzle may be removably coupled to the can to allow the contents to be dispersed as desired. Customarily, however, the amount of fluid these containers dispense is dependent on a user's angular tilt of the spout or nozzle of the container. Sole reliance of the flow rate on the angle at which the container is held may lead to excessive, disproportionate, or otherwise undesirable surges of liquid from the container.

Accordingly, contrivances such as actuator systems or twist flow controls have been utilized to enable controlled dispensing of the liquid.

However, the addition of liquid dispensing systems to standard oil can lids may present problems. For example, incorporation of dispensing systems can cause the liquids housed in the cans to become contaminated with dirt, dust, or grime.

As such, it would be beneficial to provide a liquid dispensing lid that not only provides variable flow rates, but also provides protection from airborne microbes or other foreign substances.

BRIEF SUMMARY

Briefly, the present disclosure relates, in one embodiment, to a lid apparatus for dispensing a liquid from a container. The lid apparatus may include a lid body. The lid body may include a spout opening defined in the lid body; a handle opposite the spout opening; and a vent opening defined in the lid body between the spout opening and the handle. The lid apparatus may also include an elongate pin slidably received in the body and translatable between a closed position and an open position. The elongate pin may include a spout sealing end in sealing contact with the lid body to close the spout opening in the closed position; an actuating end opposite the spout sealing end; and a vent sealing portion in sealing contact with the lid body to close the vent opening in the closed position. The lid apparatus may further include a resilient member biasing the elongate pin into the closed position and an actuator disposed on the handle and connected to the actuating end, such that the actuator pulls the elongate pin into the open position when the actuator is engaged by a human user.

An alternative embodiment of a lid apparatus may further include a threaded female lid opening defined in the lid body to threadedly engage a container.

Still another alternative embodiment may include a container. The container may include a threaded male container opening threadedly engaged with a threaded female lid opening.

Yet another alternative embodiment may include a fill port defined in the lid body and a removable plug in sealing contact with the lid body to close the fill port.

Another alternative embodiment may include a one-way relief valve disposed on the lid body to release air during filling.

A further alternative embodiment may include a breather covering the vent opening, the breather configured to prevent at least some contaminants from passing through the vent opening.

An alternative embodiment may include the lid body further including a spout opposite the handle. The spout may include the spout opening defined in the spout and a threaded male spout end.

A further still alternative embodiment may include a nozzle. The nozzle may include a threaded female nozzle end threadedly engaged with the male spout end; a dispensing end opposite the female nozzle end; and a nozzle axial hole defined in the nozzle and extending from the female nozzle end to the dispensing end.

Yet another alternative embodiment may include a nozzle cap removably secured to the nozzle to cover the dispensing end.

Still another alternative embodiment may include the nozzle being an adjustable nozzle including a plurality of desired flow rate settings.

An even further alternative embodiment may include a spout extender conduit. The spout extender conduit may include a threaded female extender end threadedly engaged with the male spout end and a threaded male extender end opposite the female extender end.

Another alternative embodiment may include a nozzle. The nozzle may include a threaded female nozzle end threadedly engaged with the male extender end; a dispensing end opposite the female nozzle end; and a nozzle axial hole defined in the nozzle and extending from the female nozzle end to the dispensing end.

Yet another alternative embodiment may include the spout extender conduit being flexible.

The present disclosure also relates, in one embodiment, to a lid apparatus. The lid apparatus may include a lid frame. The lid frame may include a dispenser opening defined in the lid frame; a handle opposite the dispenser opening; and a guide cylinder defined in the lid frame between the dispenser opening and the handle. The guide cylinder may include a container end; an actuator end opposite the container end, the actuator end nearer the handle than the container end; and a guide cylinder inner surface extending from the container end to the actuator end. The lid frame may further include a vent opening defined in the lid frame and extending from the guide cylinder inner surface to an outer surface of the lid frame. The lid apparatus may also include a guide piston slidably received in the guide cylinder and translatable between an open position and a closed position. The guide piston may include a distal end in sealing contact with the lid frame in the closed position to seal the dispenser opening; an actuator opposite the distal end; and at least one annular protrusion between the distal end and the actuator, the at least one annular protrusion in sealing contact with the guide cylinder inner surface between the container end and the vent opening in the closed position and between the vent opening and the actuator end in the open position. The lid apparatus may also include a resilient member biasing the guide piston to the closed position.

An alternative embodiment may include the guide piston further including at least one second annular protrusion between the distal end and the actuator. The second annular protrusion may be in sealing contact with the guide cylinder inner surface between the vent opening and the actuator end in both the open position and the closed position.

Still another embodiment may include a locking mechanism configured to selectively lock the guide piston in the open position.

Another embodiment may include the locking mechanism including at least one locking post disposed on the handle and at least one hook disposed on the actuator and configured to releasably engage the locking post.

Yet another embodiment may include a container connected to the lid body and a liner disposed in the container and configured to reduce contamination of the container.

The present disclosure also relates, in one embodiment, to a method of dispensing a liquid from a container including a lid. The method may include engaging an actuator of an elongate pin, thereby simultaneously pulling a distal end of the elongate pin away from a spout opening and pulling a radial protrusion of the elongate pin from a closed side of a vent opening to an open side of the vent opening; and releasing the actuator, thereby allowing the distal end of the elongate pin to return to a spout-closed position and the radial protrusion to return to the closed side of the vent opening.

In an alternative embodiment, the method may include engaging the actuator a predetermined amount, thereby pulling a hook disposed on the elongate pin over a locking post disposed on a handle of the lid to lock the elongate pin in place; and removing the hook from the locking post to unlock the elongate pin.

It is to be understood that both the foregoing general description and the following detailed description present embodiments of the disclosure and are intended to provide an overview or framework for understanding the nature and character of the disclosure as it is claimed. The description serves to explain the principles and operations of the claimed subject matter. Other and further features and advantages of the present disclosure will be readily apparent to those skilled in the art upon a reading of the following disclosure.

DETAILED DESCRIPTION

Reference now will be made in detail to embodiments of the present disclosure, one or more drawings of which are set forth hereinbelow. Each drawing is provided by way of explanation of the present disclosure and is not a limitation. In fact, it will be apparent to those skilled in the art that various modifications and variations can be made to the teachings of the present disclosure without departing from the scope of the disclosure. For instance, features illustrated or described as part of one embodiment, can be used with another embodiment to yield a still further embodiment.

Thus, it is intended that the present disclosure covers such modifications and variations as come within the scope of the appended claims and their equivalents. Other objects, features and aspects of the present disclosure are disclosed in or are obvious from the following detailed description. It is to be understood by one of ordinary skill in the art that the present discussion is a description of exemplary embodiments only and is not intended as limiting the broader aspects of the present disclosure.

As described herein, the term "oil" is defined as any chemical substance consisting chiefly or wholly of mixtures of hydrocarbons and/or is a viscous liquid at ambient temperatures.

As described herein, the term "liquid" is defined as a freely flowing substance of constant volume.

Referring to FIGS. 1-10, the lid apparatus 100 may be threadedly engaged with a container 102. The lid apparatus 100 may also be in sealing contact with the container 102. The lid apparatus 100 may include a lid body (or lid frame) 104. The lid body 104 may be made of any appropriate material or composite of materials, including metallic and non-metallic materials. The lid body 104 may be made of a single and continuous part or of multiple parts joined together permanently or semi-permanently.

Figure 6:
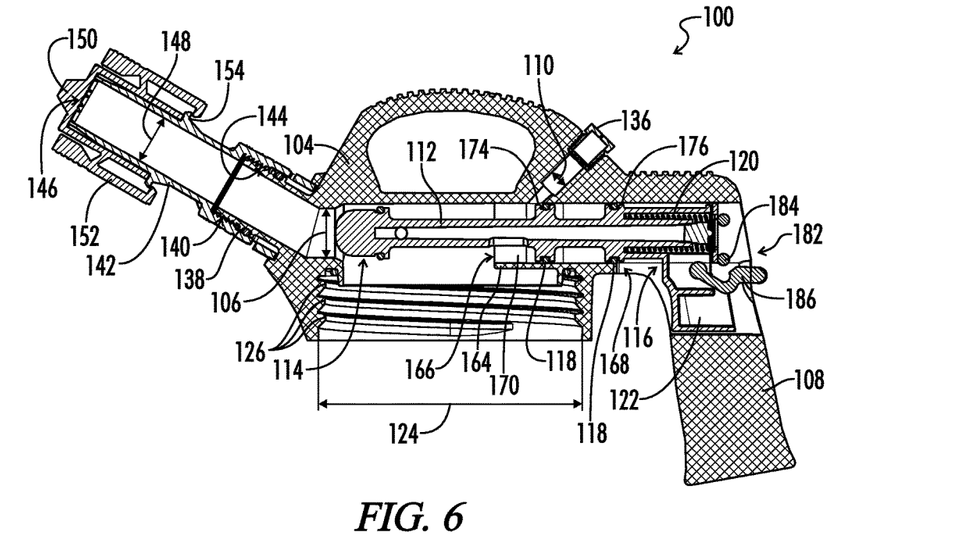
FIG. 6 is a cross-sectional view of the lid apparatus of FIG. 1 with the elongate pin (or guide piston) in an open position.
Figure 7:
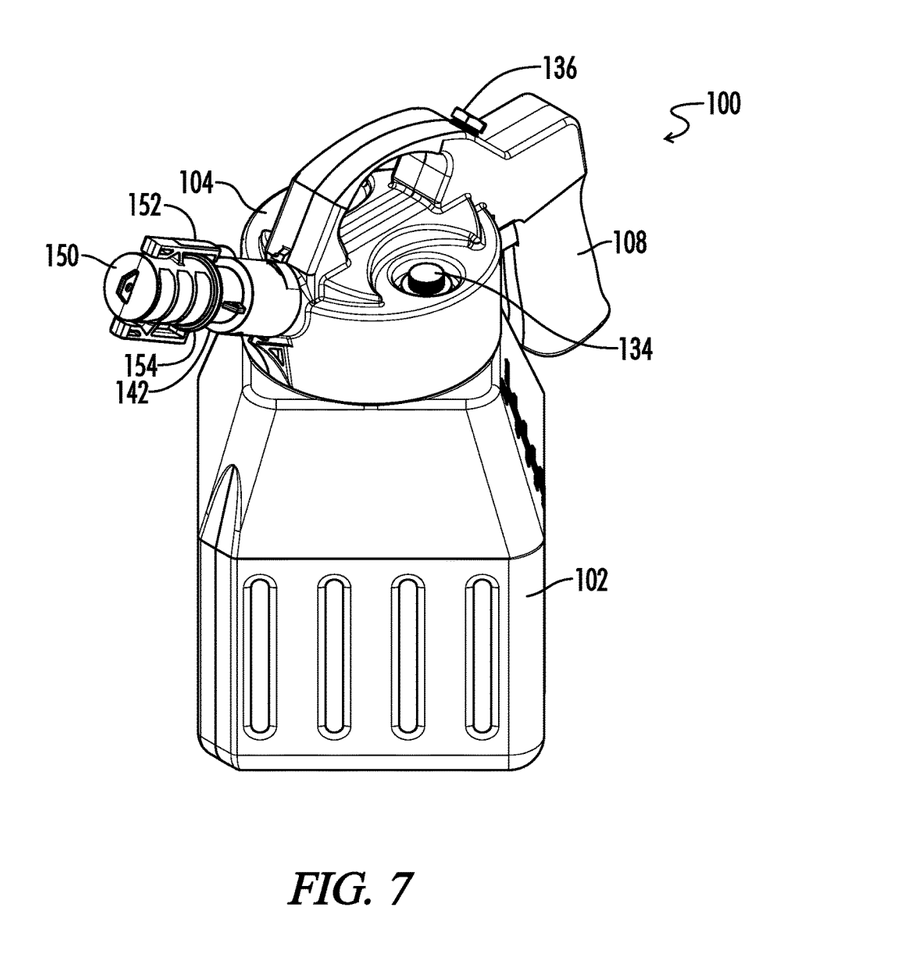
FIG. 7 is a perspective view of the lid apparatus of FIG. 1 including a container.
Figure 8:
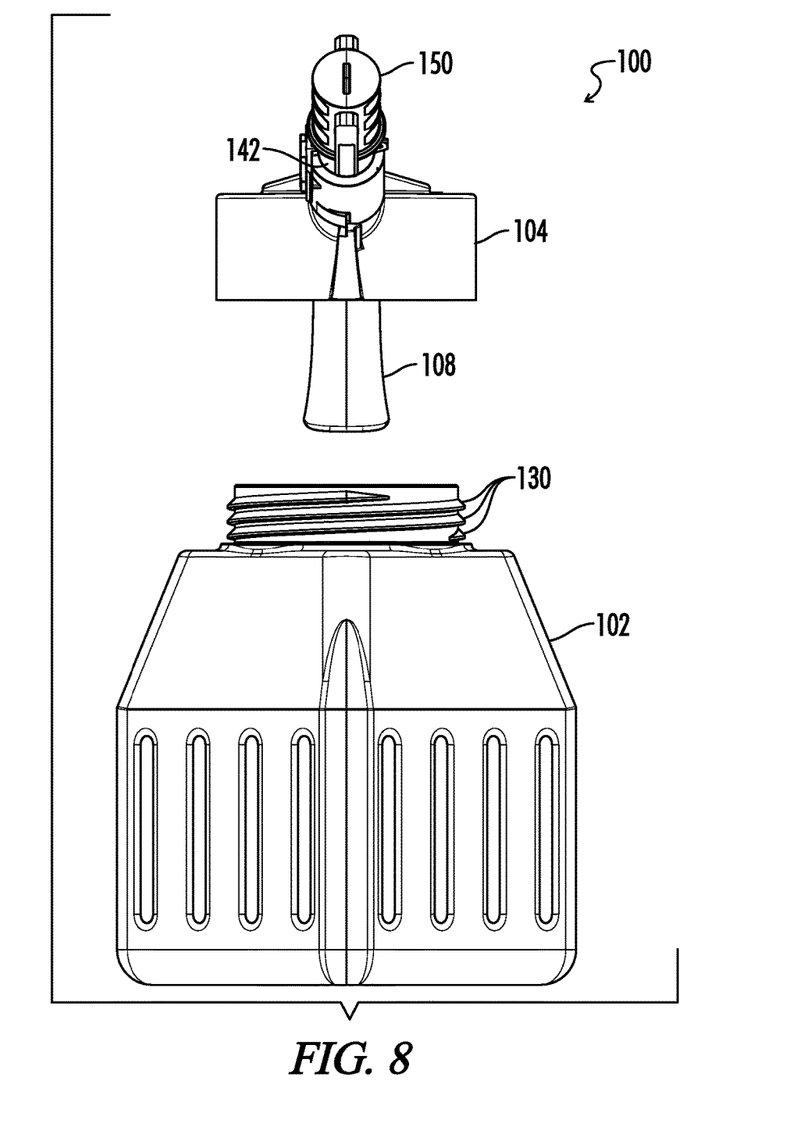
FIG. 8 is a front view of the lid apparatus of FIG. 7 exploded from the container.

As can best be seen in FIG. 6, the lid body 104 may include a spout opening (or dispenser opening) 106 defined in the lid body. The lid body 104 may also include a handle 108 opposite the spout opening 106. A vent opening 110 may be defined in the lid body 104 between the spout opening 106 and the handle 108. The vent opening 110 may allow air to pass through the lid apparatus 100 while liquid is dispensed.

The lid apparatus 100 may also include an elongate pin (or guide piston) 112 slidably received in the lid body 104 and translatable between a closed position and an open position. In one embodiment of the lid apparatus 100, the distance the elongate pin 112 is translated may vary the flow rate of a liquid dispensed via the lid apparatus. The elongate pin 112 may include a spout sealing end (or distal end) 114 in sealing contact with the lid body 104 to close the spout opening 106 in the closed position. The elongate pin 112 may also include an actuating end 116 opposite the spout sealing end 114. The elongate pin 112 may further include a vent sealing portion 118 in sealing contact with the lid body 104 to close the vent opening 110 in the closed position.

Figure 1:
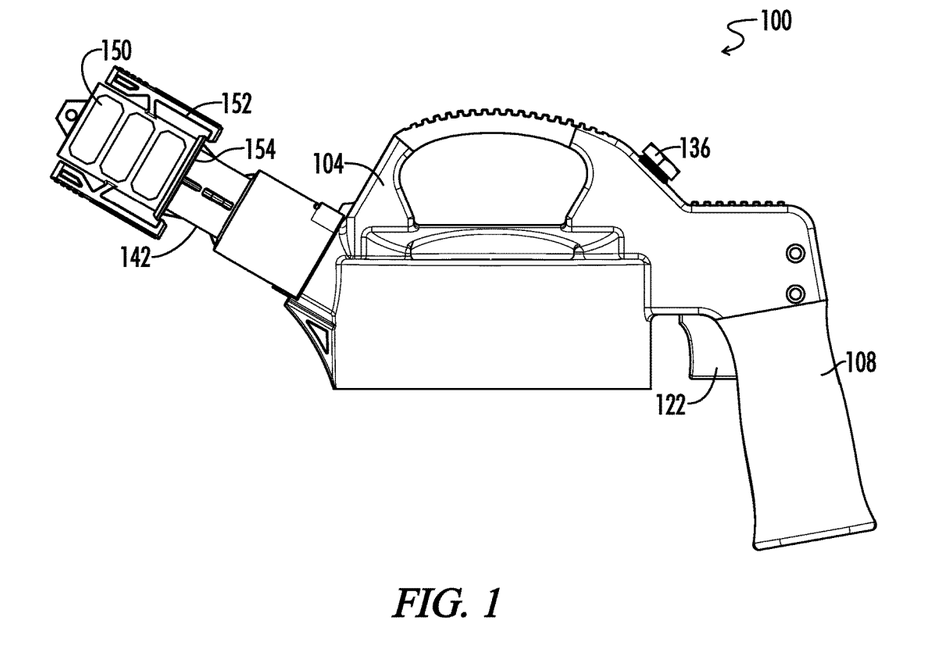
FIG. 1 is a side view of one embodiment of the lid apparatus.
Figure 2:
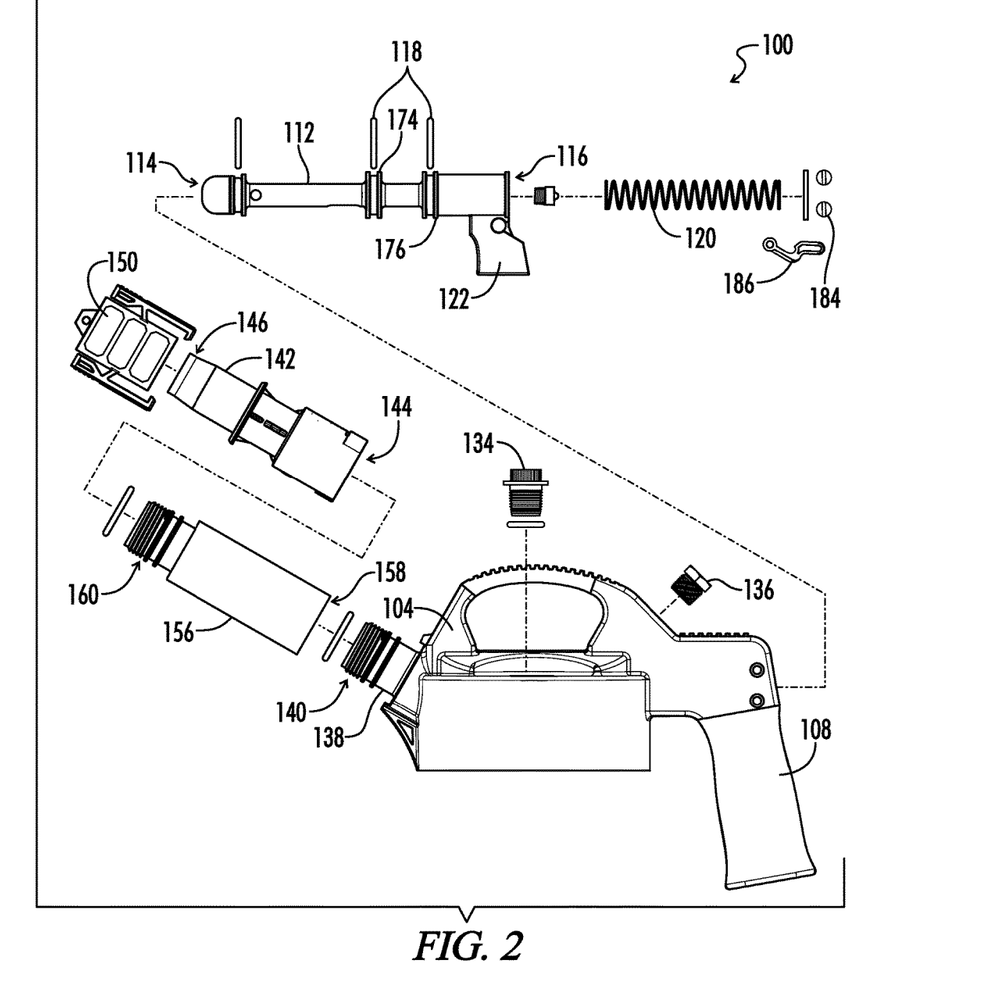
FIG. 2 is a side exploded view of an alternative embodiment of the lid apparatus including an extender.
Figure 3:
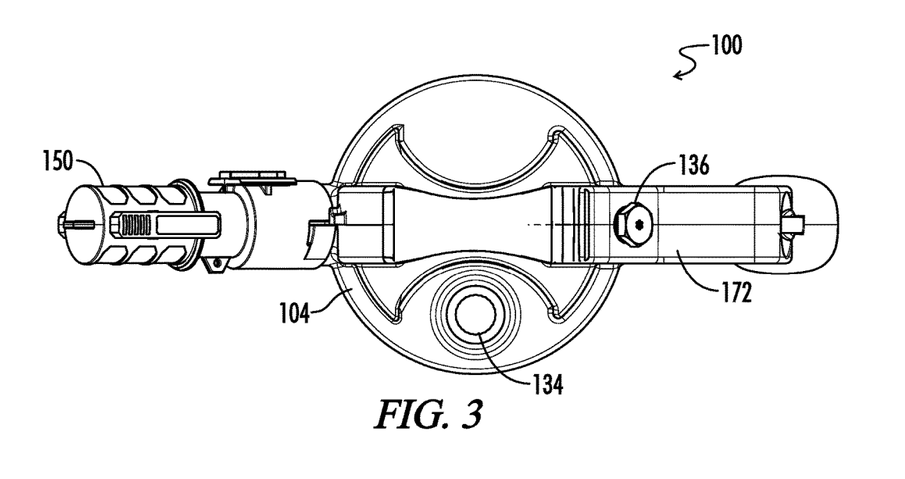
FIG. 3 is a top view of the lid apparatus of FIG. 1.
Figure 9:
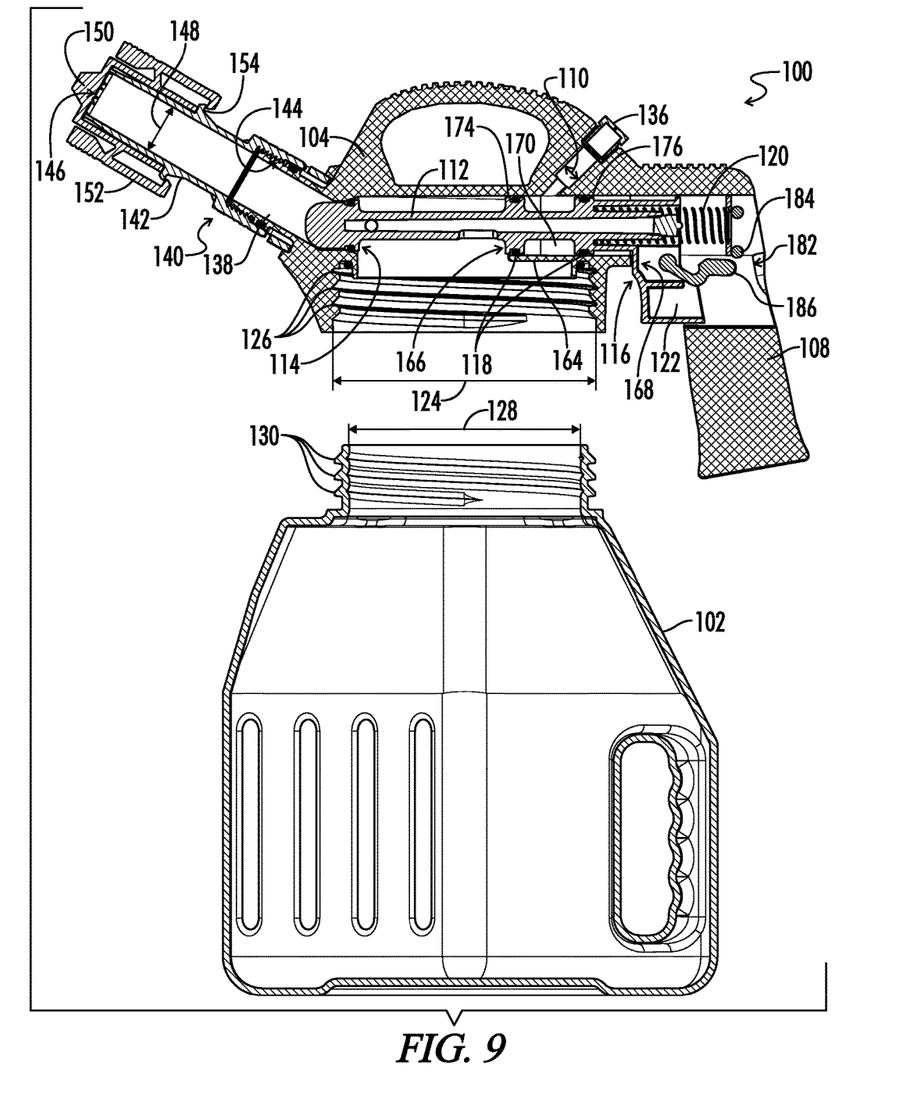
FIG. 9 is a side cross-sectional view of the lid apparatus of FIG. 8 with the elongate pin (or guide piston) in a closed position, the lid apparatus exploded from the container.

As can best be seen in FIG. 2 and FIG. 9, the lid apparatus 100 may also include a resilient member 120 biasing the elongate pin 112 into the closed position. The resilient member 120 may be any structure suitable to bias the elongate pin 112 into the closed position. Non-limiting examples of the resilient member 120 may include a helical spring, flat spring, dimensions of the lid body 104 itself, and the like.

The lid apparatus 100 may further include an actuator 122 disposed on the handle 108 and connected to the actuating end 116. The actuator 122 pulls the elongate pin 112 into the open position when the actuator is engaged by a human user. The actuator 122 may be formed as one piece with the elongate pin 112, or it may be connected to the elongate pin in any known suitable fashion.

Figure 4:
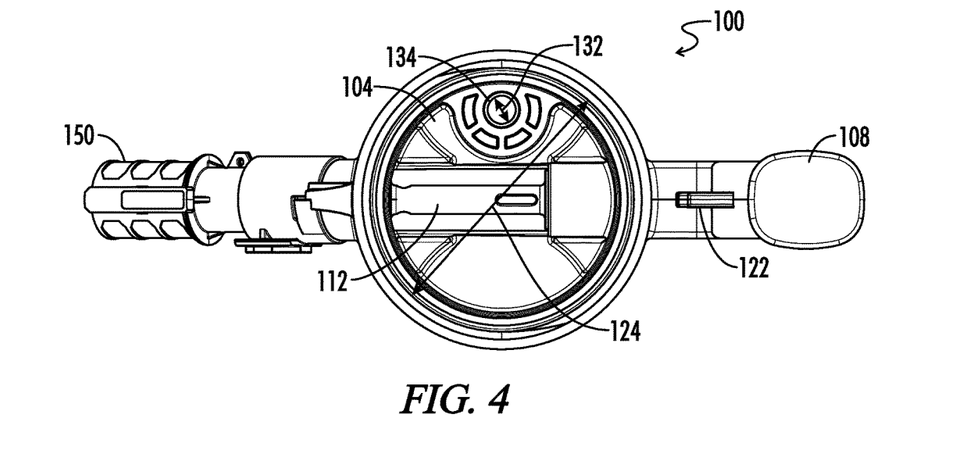
FIG. 4 is a bottom view of the lid apparatus of FIG. 1.
Figure 5:
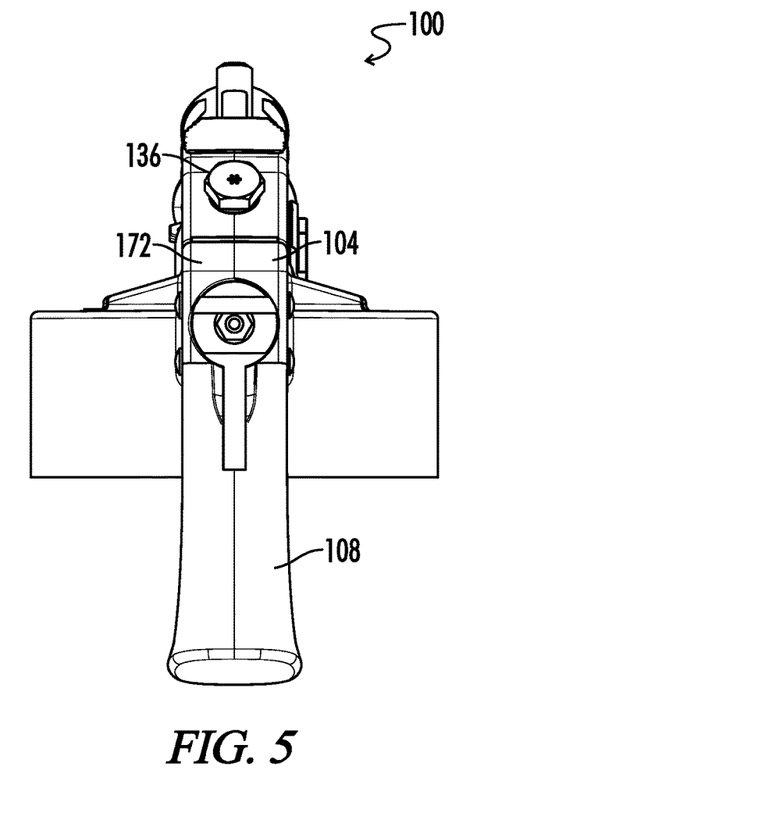
FIG. 5 is a back view of the lid apparatus of FIG. 1.

As can be seen best in FIG. 4, FIG. 6, and FIG. 9, the lid apparatus 100 may include the lid body 104 including a threaded female lid opening 124 defined in the lid body. The threaded female lid opening 124 may have threads 126 to threadedly engage the container 102. The container 102 may include a threaded male container opening 128 including threads 130 complementary to the threads 126 of the threaded female lid opening 124. Alternatively, the lid apparatus 100 may be removably secured to the container 102 in any fashion known in the art including, but not limited to, press fitting, using any kind of fastener, and the like.

As can be seen best in FIG. 4, the lid apparatus 100 may further include a fill port 132 defined in the lid body 104. The fill port 132 may be of any suitable size and shape so as to allow filling of the container 102 without removal of the lid apparatus 100. As can be seen best in FIG. 7, a removable plug 134 may be placed in sealing contact with the lid body 104 to close the fill port 132 when it is not in use. The lid apparatus 100 may also include a one-way relief valve disposed on the lid body 104 to release excess air pressure. The one-way relief valve may be formed as one piece with the lid body 104, may be attached to the lid body, may be a part of the elongate pin 112 at the actuating end 116, attached to the elongate pin at the actuating end, and the like. In embodiments including the one-way relief valve disposed on the elongate pin 112, the one-way relief valve may be in fluid communication with the interior of the lid apparatus 100 and the container 102. The path providing the fluid communication may include a path through the elongate pin 112 itself, through the lid body 104, and the like. Both the plug 134 and the valve may be secured to the lid body 104 in any fashion known in the art including, but not limited to, press fitting, using any kind of fastener, threaded engagement, and the like.

A breather 136 may cover the vent opening 110 of the lid apparatus 100. The breather 136 may be configured to prevent at least some contaminants from passing through the vent opening 110 including, but not limited to, humidity, dust, dirt, bacteria, and the like. The breather 136 may be removably secured to the lid body 104 to allow for replacement of the breather. The breather 136, however, may be permanently secured to the lid body 104 or formed as one piece with the lid body. If the breather 136 is removably secured to the lid body 104, it may be secured in any manner known in the art including, but not limited to, threadedly engaged with the lid body, press fit in the lid body, attached via at least one fastener, and the like.

The lid apparatus 100 may also include a spout 138. The spout 138 may be opposite the handle 108. The spout 138 may include the spout opening 106 defined in the spout and may also include a threaded male spout end 140.

The lid apparatus 100 may further include a nozzle 142. Alternatively, the lid apparatus 100 may include a plurality of different nozzles 142 to selectably attach to the lid apparatus. The nozzle 142 may include a threaded female nozzle end 144. The threaded female nozzle end 144 may be configured to threadedly engage with the threaded male spout end 140. Alternatively, the nozzle 142 may be removably secured to the lid body 104 in any fashion known in the art including, but not limited to, press fitting, using any kind of fastener, and the like. The nozzle 142 may also include a dispensing end 146 opposite the threaded female nozzle end 144. The nozzle 142 may also include a nozzle axial hole 148 defined in the nozzle and extending from the threaded female nozzle end 144 to the dispensing end 146. The nozzle axial hole 148 may be of a constant diameter from the threaded female nozzle end 144 to the dispensing end 146, or the diameter may vary from the threaded female nozzle end to the dispensing end. The nozzle axial hole 148 may be of any suitable diameter, and if there are multiple nozzles 142, the diameters of the respective nozzle axial holes 148 may vary. If the embodiment of the lid apparatus 100 has only one nozzle 142, the nozzle may be an adjustable nozzle including a plurality of desired flow rate settings. The nozzle 142 may be adjustable in any manner known in the art including, but not limited to, turning the nozzle to bring the nozzle closer to an obstruction member (not shown) disposed in the nozzle axial hole 148, sliding an obstruction member in and out of the way of the nozzle axial hole, and the like.

In some embodiments, the lid apparatus 100 may further include a nozzle cap 150 removably secured to the nozzle 142 to cover the dispensing end 146. The nozzle cap 150 may be removably secured to the nozzle 142 in any manner known in the art including, but not limited to, snap-on elements 152 engaging a ridge 154 of the nozzle, the nozzle cap threadedly engaging the nozzle, the nozzle cap interference fit onto the nozzle, and the like.

As can be seen in FIG. 2, the lid apparatus 100 may also include a spout extender conduit 156. The spout extender conduit 156 may include a threaded female extender end 158 configured to threadedly engage the threaded male spout end 140. The spout extender conduit 156 may also include a threaded male extender end 160 opposite the threaded female extender end 158. In some embodiments, the spout extender conduit 156 may be flexible. The spout extender conduit 156 may be a typical garden hose (not shown) of an appropriate length in some embodiments. In an embodiment of the lid apparatus 100 including a spout extender conduit 156, the lid apparatus may also include the nozzle 142 including the threaded female nozzle end 144 configured to threadedly engage the threaded male extender end 160. Alternatively, the spout extender conduit 156 may be removably secured to both the lid body 104 and the nozzle 142 in any fashion known in the art including, but not limited to, press fitting, using any kind of fastener, and the like.

As can be best seen in FIG. 6 and FIG. 9, another embodiment of the lid apparatus 100 may include the lid frame 104 including a guide cylinder 164 defined in the lid frame between the dispenser opening 106 and the handle 108. The guide cylinder 164 may include a container end 166 and an actuator end 168 opposite the container end. The actuator end 168 may be nearer the handle 108 than the container end 166. The guide cylinder 164 may also include a guide cylinder inner surface 170. The guide cylinder inner surface 170 may extend from the container end 166 to the actuator end 168.

In embodiments of the lid apparatus 100 including a guide cylinder 164, the vent opening 110 defined in the lid frame 104 may extend from the guide cylinder inner surface 170 to an outer surface 172 of the lid frame.

The guide cylinder 164 may receive the guide piston 112 such that the guide piston is translatable between an open position and a closed position. The guide piston 112 may include at least one annular protrusion 174. The annular protrusion 174 may be between the distal end 114 of the guide piston 112 and the actuator 122. The at least one annular protrusion 174 may be in sealing contact with the guide cylinder inner surface 170 between the container end 166 and the vent opening 110 in the closed position. The at least one annular protrusion 174 may be in sealing contact with the guide cylinder inner surface 170 between the vent opening 110 and the actuator end 168 of the guide cylinder 164 in the open position. The sealing contact may be accomplished by any manner known in the art including, but not limited to, appropriate fit tolerances, gaskets, and the like.

In some embodiments, the guide piston 112 may further include at least one second annular protrusion 176 between the distal end 114 and the actuator 122. The second annular protrusion 176 may be in sealing contact with the guide cylinder inner surface 170 between the vent opening 110 and the actuator end 168 in both the open position and the closed position.

In alternative embodiments, the guide cylinder 164 may be of another shape including, but not limited to, square, triangular, rectangular, and the like. In any configuration, the guide piston 112 may include the first protrusion 174 and second protrusion 176 of different shapes including, but not limited to, tabs, radial protrusions, portions of the guide piston that receive gaskets, and the like.

In one embodiment, the lid apparatus 100 may also include the guide piston 112 including a longitudinal slot. The lid frame 104 may include at least one corresponding guide post extending into the longitudinal slot to allow the guide piston 112 to maintain its proper position while translating.

The lid apparatus 100 may include a locking mechanism 182 configured to selectively lock the guide piston 112 in the open position. The locking mechanism 182 may include at least one locking post 184 disposed on the handle 108 and at least one hook 186 disposed on the actuator 122 configured to releasably engage the locking post.

Figure 10:
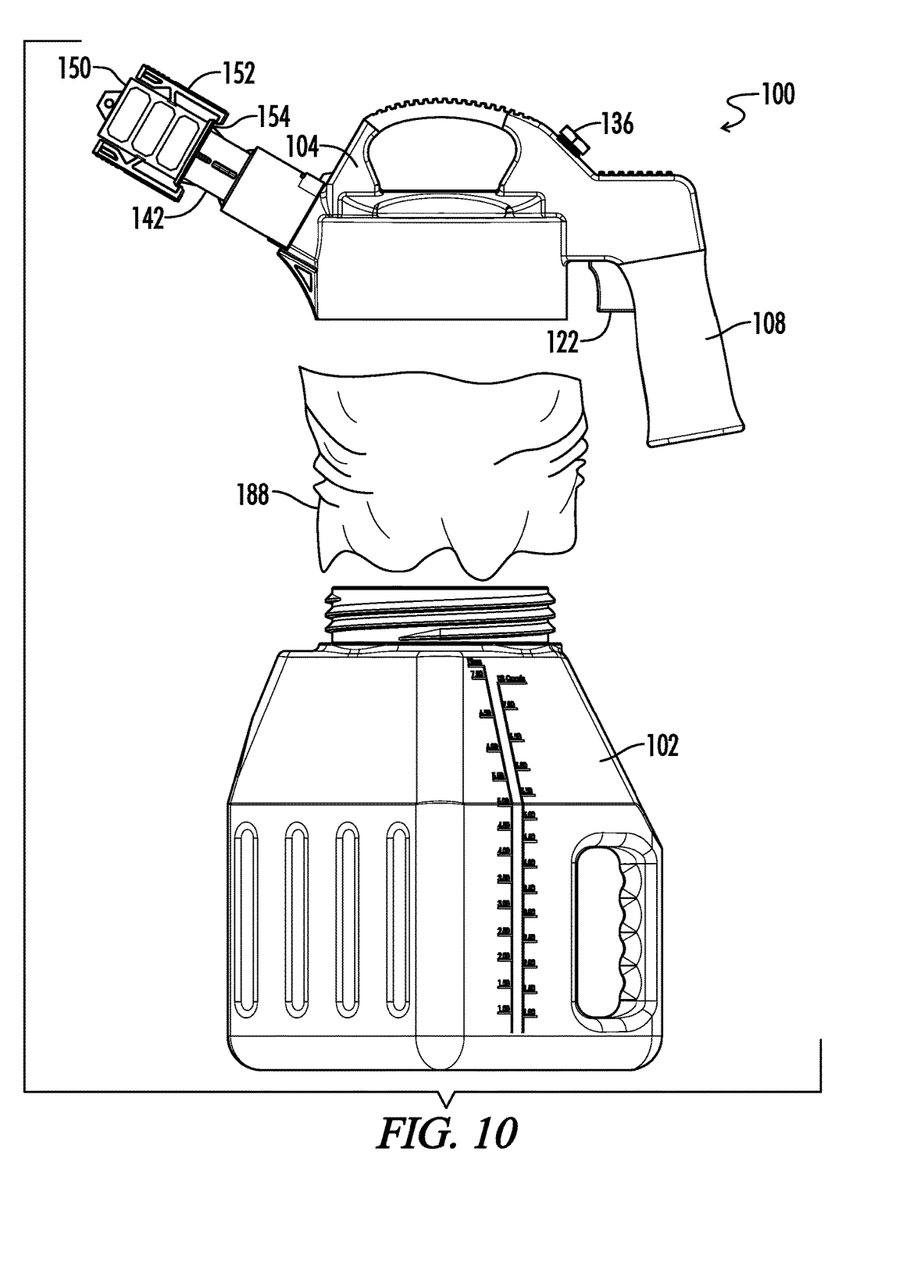
FIG. 10 is a side view of the lid apparatus of FIG. 1 including a container and a liner.

As can be best seen in FIG. 10, the lid apparatus 100 may further include a liner 188 detachably coupled to the lid apparatus. The liner 188 may be received inside the container 102 and may be regularly replaced as an alternative to routine cleaning of the container.

A method of dispensing a liquid from a container 102 including a lid 100 may include engaging an actuator 122 of an elongate pin 112, thereby simultaneously pulling a distal end 114 of the elongate pin away from a spout opening 106 and pulling a radial protrusion 174 of the elongate pin from a closed side of a vent opening 110 to an open side of the vent opening; and releasing the actuator, thereby allowing the distal end of the elongate pin to return to a spout-closed position and the radial protrusion to return to the closed side of the vent opening.

The method may further include engaging the actuator 122 a predetermined amount, thereby pulling a hook 186 disposed on the elongate pin 112 over a locking post 184 disposed on the handle 108 of the lid 100 to lock the elongate pin in place; and removing the hook from the locking post to unlock the elongate pin.

This written description uses examples to disclose the invention and also to enable any person skilled in the art to practice the invention, including making and using any devices or systems. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Although embodiments of the disclosure have been described using specific terms, such description is for illustrative purposes only. The words used are words of description rather than of limitation. It is to be understood that changes and variations may be made by those of ordinary skill in the art without departing from the spirit or the scope of the present disclosure, which is set forth in the following claims. In addition, it should be understood that aspects of the various embodiments may be interchanged in whole or in part. For example, while an apparatus for oil dispensing has been exemplified, other uses are contemplated. Therefore, the spirit and scope of the appended claims should not be limited to the description of the versions contained therein.

What is claimed is:

1. A lid apparatus comprising:
   a lid body including:
      a spout opening defined in the lid body;
      a handle opposite the spout opening; and
      a vent opening defined in the lid body between the spout opening and the handle;
   an elongate pin slidably received in the lid body and translatable between a closed position and an open position, the elongate pin including:
      a spout sealing end in sealing contact with the lid body to close the spout opening in the closed position;
      an actuating end opposite the spout sealing end; and
      a vent sealing portion disposed in the lid body, the vent sealing portion in sealing contact with the lid body to close the vent opening in the closed position;
   a resilient member biasing the elongate pin into the closed position; and
   an actuator disposed on the handle and connected to the actuating end, such that the actuator pulls the elongate pin into the open position when the actuator is engaged by a human user.

2. The apparatus of claim 1, wherein the lid body further includes a threaded female lid opening defined in the lid body to threadedly engage a container.

3. The apparatus of claim 2, further comprising a container including a threaded male container opening threadedly engaged with the threaded female lid opening.

4. The apparatus of claim 1, further comprising:
   a fill port defined in the lid body; and
   a removable plug in sealing contact with the lid body to close the fill port.

5. The apparatus of claim 4, further comprising a one-way relief valve disposed on the lid body to release air during filling.

6. The apparatus of claim 1, further comprising a breather covering the vent opening, the breather configured to prevent at least some contaminants from passing through the vent opening.

7. The apparatus of claim 1, the lid body further including:
   a spout opposite the handle, the spout including:
      the spout opening defined in the spout; and
      a threaded male spout end.

8. The apparatus of claim 7, further comprising:
   a nozzle including:
      a threaded female nozzle end threadedly engaged with the male spout end;
      a dispensing end opposite the female nozzle end; and
      a nozzle axial hole defined in the nozzle and extending from the female nozzle end to the dispensing end.

9. The apparatus of claim 8, further comprising:
   a nozzle cap removably secured to the nozzle to cover the dispensing end.

10. The apparatus of claim 8, wherein the nozzle is an adjustable nozzle including a plurality of desired flow rate settings.

11. The apparatus of claim 7, further comprising:
a spout extender conduit including:
   a threaded female extender end threadedly engaged with the male spout end; and
   a threaded male extender end opposite the female extender end.

12. The apparatus of claim 11, further comprising:
a nozzle including:
   a threaded female nozzle end threadedly engaged with the male extender end;
   a dispensing end opposite the female nozzle end; and
   a nozzle axial hole defined in the nozzle and extending from the female nozzle end to the dispensing end.

13. The apparatus of claim 11, wherein the spout extender conduit is flexible.

14. A lid apparatus comprising:
a lid frame including:
   a dispenser opening defined in the lid frame;
   a handle opposite the dispenser opening;
   a guide cylinder defined in the lid frame between the dispenser opening and the handle, the guide cylinder including:
      a container end;
      an actuator end opposite the container end, the actuator end nearer the handle than the container end; and
      a guide cylinder inner surface extending from the container end to the actuator end; and
   a vent opening defined in the lid frame and extending from the guide cylinder inner surface to an outer surface of the lid frame;
a guide piston slidably received in the guide cylinder and translatable between an open position and a closed position, the guide piston including:
   a distal end in sealing contact with the lid frame in the closed position to seal the dispenser opening;
   an actuator opposite the distal end; and
   at least one annular protrusion between the distal end and the actuator, the at least one annular protrusion in sealing contact with the guide cylinder inner surface between the container end and the vent opening in the closed position and between the vent opening and the actuator end in the open position; and
a resilient member biasing the guide piston to the closed position.

15. The apparatus of claim 14, the guide piston further including at least one second annular protrusion between the distal end and the actuator, the second annular protrusion in sealing contact with the guide cylinder inner surface between the vent opening and the actuator end in both the open position and the closed position.

16. The apparatus of claim 14, further comprising a locking mechanism configured to selectively lock the guide piston in the open position.

17. The apparatus of claim 16, wherein the locking mechanism includes:
   at least one locking post disposed on the handle;
   at least one hook disposed on the actuator and configured to releasably engage the locking post.

18. The apparatus of claim 14, further comprising:
   a container connected to the lid body; and
   a liner disposed in the container and configured to reduce contamination of the container.

* * * * *